UNITED STATES PATENT OFFICE.

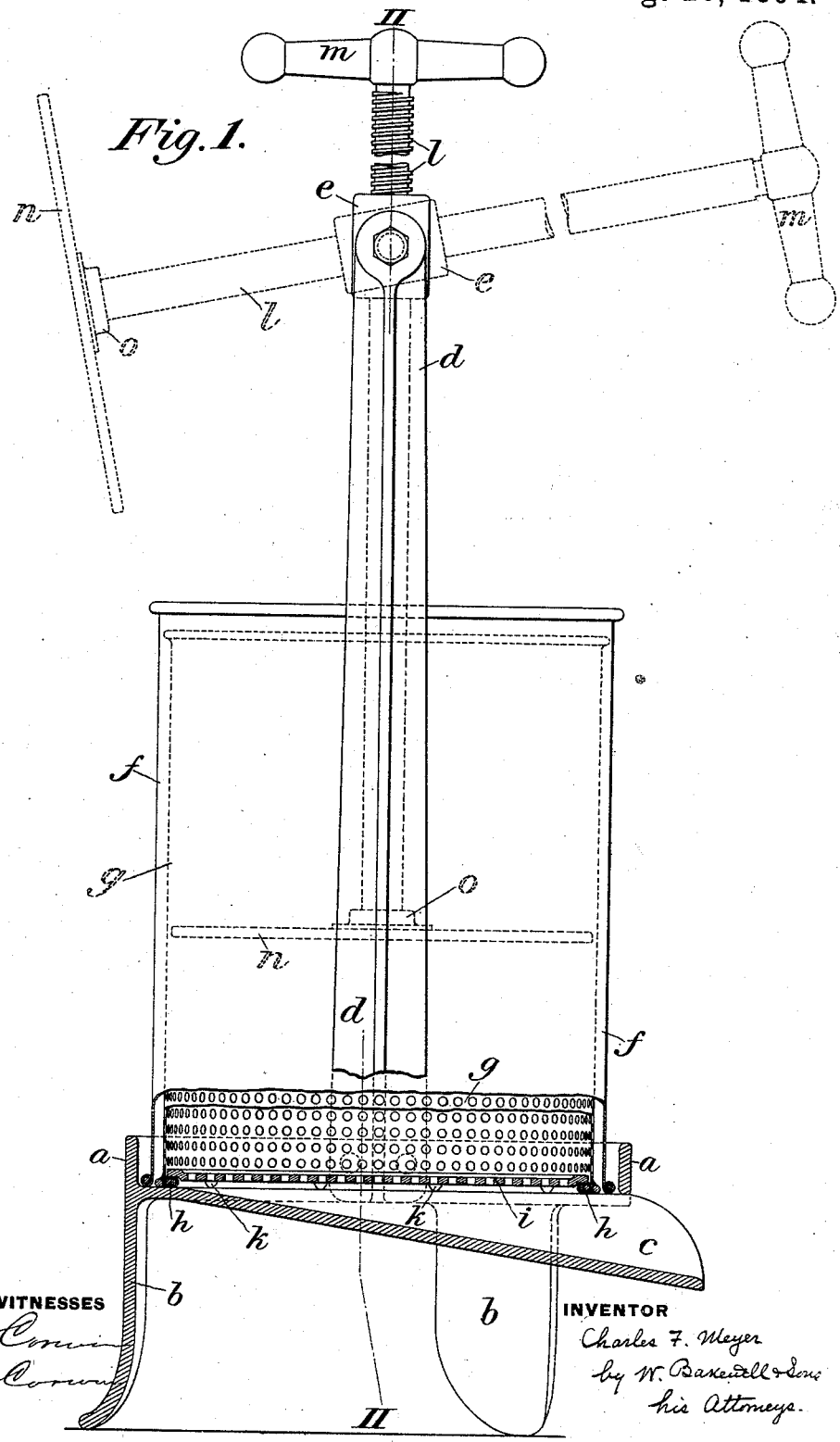

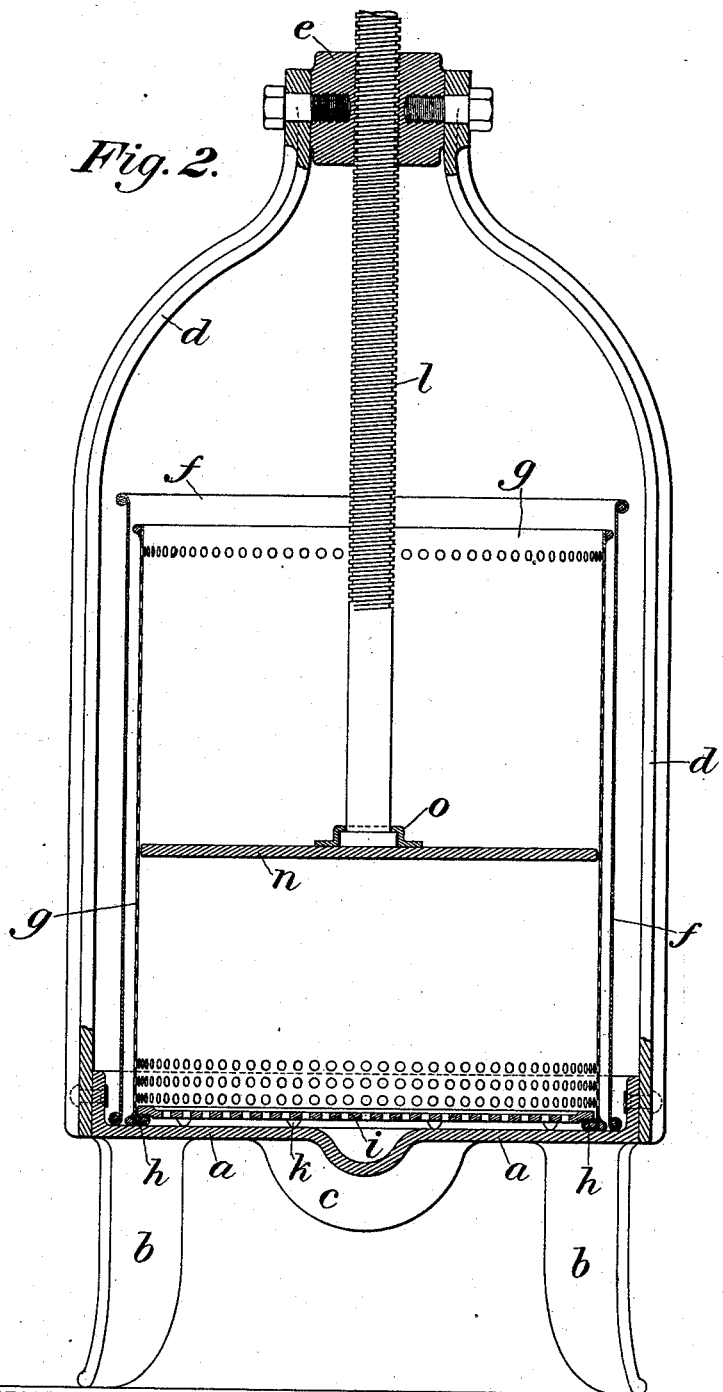

CHARLES F. MEYER, OF PITTSBURG, PENNSYLVANIA.

FRUIT OR LARD PRESS.

SPECIFICATION forming part of Letters Patent No. 525,023, dated August 28, 1894.

Application filed March 28, 1894. Serial No. 505,465. (No model.)

*To all whom it may concern:*

Be it known that I, CHARLES F. MEYER, of Pittsburg, in the county of Allegheny and State of Pennsylvania, have invented a new and useful Improvement in Fruit or Lard Presses, of which the following is a full, clear, and exact description, reference being had to the accompanying drawings, forming part of this specification, in which—

Figure 1 is a side elevation partly in section of my improved fruit press; and Fig. 2 is a vertical sectional view on the line II—II of Fig. 1.

In the drawings, $a$ represents the bed pan of the presser, which is provided with feet $b$, and a spout $c$. Secured to the pan $a$ are the vertical rods $d$ $d$, which curve inwardly toward each other at their upper end so as to form a journal bearing for the screw-threaded nut $e$, which is pivoted or journaled to the rods $d$ $d$. Resting on the bottom of the pan $a$ is the outer cylinder $f$, inside of which is the perforated cylinder $g$, having an interior rim or shoulder $h$ at its base. Resting on the rim $h$ is the perforated bottom plate $i$, having lugs or feet $k$, which rest on the bottom of the pan $a$. Passing through the nut $e$ is the threaded shaft $l$, having a handle $m$. At the lower end of this shaft $l$ is the pressing plate $n$, which is loosely secured to the shaft $l$ by the cap $o$ fitting over a collar on the end of the shaft so that the shaft may revolve without rotating the presser-head.

The operation is as follows:—The fruit is placed in the inner perforated cylinder $g$, which is placed inside of the outer cylinder $f$. The shaft $l$ is swung into a vertical position, the nut $e$ moving on its pivots, and the pressing plate $n$ is brought down on the fruit in the perforated cylinder $g$ by turning the shaft in the threaded nut $e$, and the pressure caused thereby forces the fruit juices through the perforations of the cylinder, which juices flow down into the pan $a$ and thence through the spout $c$. When the juices have been extracted, the shaft and pressing plate are withdrawn and are swung into a horizontal position so as to be out of the way, as shown in Fig. 1, and the perforated cylinder $g$, carrying the perforated bottom plate $i$ and the pulp resting thereon, is removed from the outer cylinder $f$, and the pulp is removed from the cylinder $g$ by reversing the same and pressing down on the loose bottom plate $i$.

Although I have described my improved presser as applied to pressing fruit, I do not desire to limit its use to fruit, as it may be used in pressing lard and other substances.

The advantages of my improvement will be apparent to those skilled in the art.

The follower being suspended from the pivoted nut may be easily swung out of the way when desired, while the construction is simple and effective.

What I claim is—

In a press, the combination with the cylinder, of a screw-threaded shaft carrying the presser-plate, a supporting nut through which the shaft passes, and trunnions upon which the nut is pivotally supported; substantially as described.

In testimony whereof I have hereunto set my hand.

CHARLES F. MEYER.

Witnesses:
 W. B. CORWIN,
 H. M. CORWIN.